(12) United States Patent
Heinikoski et al.

(10) Patent No.: US 10,278,089 B2
(45) Date of Patent: Apr. 30, 2019

(54) DETERMINING A CENTRE FREQUENCY IN AN UNLICENSED FREQUENCY BAND TO USE

(71) Applicant: Telefonaktiebolaget LM Ericsson (publ), Stockholm (SE)

(72) Inventors: Kauko Heinikoski, Oulu (FI); Marko E Leinonen, Haukipudas (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 43 days.

(21) Appl. No.: 15/510,226

(22) PCT Filed: Oct. 30, 2014

(86) PCT No.: PCT/SE2014/051284
§ 371 (c)(1),
(2) Date: Mar. 9, 2017

(87) PCT Pub. No.: WO2016/053157
PCT Pub. Date: Apr. 7, 2016

(65) Prior Publication Data
US 2017/0289833 A1    Oct. 5, 2017

(30) Foreign Application Priority Data
Sep. 30, 2014 (EP) .................................. 14187220

(51) Int. Cl.
*H04L 1/00* (2006.01)
*H04W 24/10* (2009.01)
(Continued)

(52) U.S. Cl.
CPC ........... *H04W 24/10* (2013.01); *H04W 16/14* (2013.01); *H04W 24/00* (2013.01); *H04W 24/02* (2013.01);
(Continued)

(58) Field of Classification Search
CPC ..... H04W 24/20; H04W 24/00; H04W 72/00; H04W 72/042; H04W 72/0453;
(Continued)

(56) References Cited

U.S. PATENT DOCUMENTS

2009/0291653 A1* 11/2009 Suzuki .................. H03F 1/3241
455/127.2
2010/0098200 A1*  4/2010 Gupta ...................... H04J 1/12
375/354

(Continued)

OTHER PUBLICATIONS

International Search Report and Written Opinion for Application No. PCT/SE2014/051284, dated Jun. 9, 2015, 11 pages.

*Primary Examiner* — Sai Ming Chan
(74) *Attorney, Agent, or Firm* — Sage Patent Group (57) ABSTRACT

A method for determining a center frequency in an unlicensed frequency band to use for downlink communication in a cellular network. The method is performed in a network node and comprises the steps of: performing a coarse pre-scan when the network node is in a transmit time slot, yielding respective coarse measurement of signal levels for a plurality of frequencies in the unlicensed frequency band; performing an accurate measurement when the network node is in a receive time slot, yielding respective accurate measurement of signal levels for a plurality of frequencies in the unlicensed frequency band; and determining at least one frequency to use as a center frequency for a downlink communication channel in the unlicensed frequency band.

20 Claims, 5 Drawing Sheets

(51) Int. Cl.
*H04W 24/00* (2009.01)
*H04W 72/00* (2009.01)
*H04W 24/02* (2009.01)
*H04W 72/04* (2009.01)
*H04W 72/08* (2009.01)
*H04W 16/14* (2009.01)

(52) U.S. Cl.
CPC ......... *H04W 72/00* (2013.01); *H04W 72/042* (2013.01); *H04W 72/0453* (2013.01); *H04W 72/085* (2013.01)

(58) Field of Classification Search
CPC ... H04W 72/085; H04W 24/10; H04W 16/14; H04W 24/02
USPC ........................................................ 370/252
See application file for complete search history.

(56) References Cited

U.S. PATENT DOCUMENTS

| | | | |
|---|---|---|---|
| 2012/0039284 A1 | 2/2012 | Barbieri et al. | |
| 2012/0282942 A1* | 11/2012 | Uusitalo | H04W 16/14 455/452.2 |
| 2013/0155991 A1 | 6/2013 | Kazmi et al. | |
| 2013/0293291 A1* | 11/2013 | Shanan | H03J 3/00 327/552 |
| 2014/0080501 A1 | 3/2014 | Lee et al. | |

* cited by examiner

DETERMINING A CENTRE FREQUENCY IN AN UNLICENSED FREQUENCY BAND TO USE

CROSS-REFERENCE TO RELATED APPLICATIONS

This application is a National stage of International Application No. PCT/SE2014/051284, filed Oct. 30, 2014, which claims priority to EP Application No. 14187220.0, filed Sep. 30, 2014, which are hereby incorporated by reference.

TECHNICAL FIELD

The invention relates to a method, a network node, a computer program and a computer program product for determining a centre frequency in an unlicensed frequency band to use.

BACKGROUND

In telecommunication, a new technology called LTE-U (Long Term Evolution in Unlicensed) is being developed, where an LTE system can be applied to other frequencies than standardised in 3GPP ($3^{rd}$ Generation Partnership Project) standards.

For instance, LTE-U can be deployed to use the 5 GHz band, which is currently used mostly for WiFi. For instance, LTE-U can be used to deploy LTE as Supplemental Downlink (SDL), with the PCell (Primary Cell) always operating on a carrier in a licensed band.

However, since the 5 GHz band is unlicensed, there can be a lot of interference.

SUMMARY

It is an object to detect interference in unlicensed bands with a low use of additional components.

According to a first aspect, it is presented a method for determining a centre frequency in an unlicensed frequency band to use for downlink communication in a cellular network. The method is performed in a network node and comprises the steps of: performing a coarse pre-scan when the network node is in a transmit time slot, yielding respective coarse measurement of signal levels for a plurality of frequencies in the unlicensed frequency band; performing an accurate measurement when the network node is in a receive time slot, yielding respective accurate measurement of signal levels for a plurality of frequencies in the unlicensed frequency band; and determining at least one frequency to use as a centre frequency for a downlink communication channel in the unlicensed frequency band. By using the two modes, different dynamic ranges can be used for the course measurement and the accurate measurement. In this way, both the transmit time slot and the receive time slot can be used to evaluate frequencies to find a good frequency to use for a channel for downlink communication for a cellular network within the unlicensed frequency band. This allows more time to evaluate frequencies, leading to a better evaluation than if only the transmit time slot is used or if only the receive time slot is used.

The step of performing a coarse pre-scan may be performed using a transmitter observation receiver, TOR.

The step of performing an accurate measurement may be performed using the TOR receiver with a first configurable gain; in which case the step of performing a coarse pre-scan is performed using the TOR with a second configurable gain. In this case, the first configurable gain is higher than the second configurable gain.

The step of performing an accurate measurement may be performed using the TOR receiver and a low noise amplifier; in which case the step of performing a coarse pre-scan is performed using the TOR without the low noise amplifier.

The step of performing an accurate measurement may be performed using a receive chain of the network node arranged to be used also for receiving uplink communication.

The method may further comprise a step of: determining a set of candidate frequencies as the frequencies for which the course measurements of signal levels are lower than a threshold level: in which case the step of performing an accurate measurement is only performed for the set of candidate frequencies.

The step of determining at least one frequency may be performed in the same receive time slot in which the step of performing the accurate measurement is performed.

According to a second aspect, it is presented a network node for determining a centre frequency in an unlicensed frequency band to use for downlink communication in a cellular network. The network node comprises: a processor; and a memory storing instructions that, when executed by the processor, causes the network node to: perform a coarse pre-scan when the network node is in a transmit time slot, yielding a coarse measurement of signal levels for a plurality of frequencies in the unlicensed frequency band; perform an accurate measurement when the network node is in a receive time slot, yielding an accurate measurement of signal levels for a plurality of frequencies in the unlicensed frequency band; and determine at least one frequency to use as a centre frequency for a downlink communication channel in the unlicensed frequency band.

The instructions to perform a coarse pre-scan may be performed using a transmitter observation receiver, TOR.

The instructions to perform an accurate measurement may be performed using the TOR receiver with a first configurable gain; in which case the instructions to perform a coarse pre-scan are executed using the TOR with a second configurable gain. In such a case, the first configurable gain is higher than the second configurable gain.

The instructions to perform an accurate measurement may be performed using the TOR receiver and a low noise amplifier; in which case the instructions to perform a coarse pre-scan are executed using the TOR without the low noise amplifier.

The instructions to perform an accurate measurement may be executed using a receive chain of the network node also used for receiving uplink communication.

The instructions may further comprise instructions that, when executed by the processor, causes the network node to: determine a set of candidate frequencies as the frequencies for which the course measurements of signal levels are lower than a threshold level; in which case the instructions to perform an accurate measurement are only performed for the set of candidate frequencies.

The instructions to determine at least one frequencies may comprise instructions that, when executed by the processor, causes the network node to determine at least one frequency in the same receive time slot in which the instructions to perform the accurate measurement are executed.

According to a third aspect, it is presented a network node comprising: means for performing a coarse pre-scan when the network node is in a transmit time slot, yielding respective coarse measurement of signal levels for a plurality of frequencies in the unlicensed frequency band; means for performing an accurate measurement when the network node is in a receive time slot, yielding respective accurate measurement of signal levels for a plurality of frequencies in the unlicensed frequency band; and means for determining at least one frequency to use as a centre frequency for a downlink communication channel in the unlicensed frequency band in a cellular network.

According to a fourth aspect, it is presented a computer program for determining a centre frequency in an unlicensed frequency band to use for downlink communication in a cellular network. The computer program comprises computer program code which, when run on a network node causes the network node to: perform a coarse pre-scan when the network node is in a transmit time slot, yielding a coarse measurement of signal levels for a plurality of frequencies in the unlicensed frequency band; perform an accurate measurement when the network node is in a receive time slot, yielding an accurate measurement of signal levels for a plurality of frequencies in the unlicensed frequency band; and determine at least one frequency to use as a centre frequency for a downlink communication channel in the unlicensed frequency band.

According to a fifth aspect, it is presented a computer program product comprising a computer program according to the fourth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
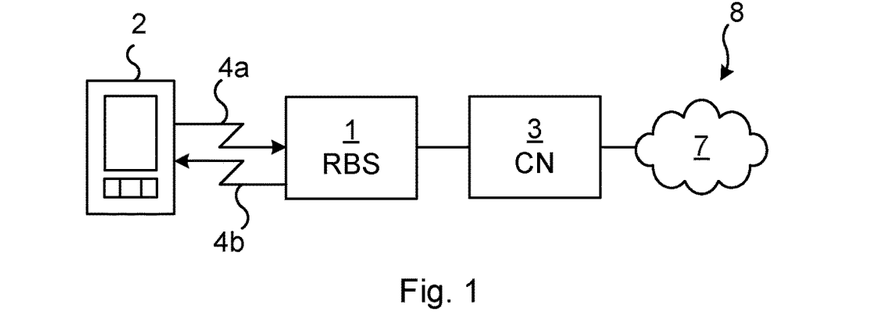
FIG. 1 is a schematic diagram illustrating a cellular communication network 8 where embodiments presented herein may be applied.

FIG. 1 is a schematic diagram illustrating a cellular communication network 8 where embodiments presented herein may be applied. The cellular communication network 8 comprises a core network 3 and one or more network nodes 1, here in the form of radio base stations being evolved Node Bs, also known as eNode Bs or eNBs. The network node is also referred to as a radio base station (RBS) herein. The network node 1 could also be in the form of Node Bs, BTSs (Base Transceiver Stations) and/or BSSs (Base Station Subsystems), etc. The network node 1 provides radio connectivity over a wireless interface 4a-b to a plurality of wireless devices 2. The term wireless device is also known as mobile communication terminal, user equipment (UE), mobile terminal, user terminal, user agent, wireless terminal, machine-to-machine device etc., and can be, for example, what today are commonly known as a mobile phone or a tablet/laptop with wireless connectivity. The term wireless is here to be construed as having the ability to perform wireless communication. More specifically, the wireless device 2 can comprise a number of wires for internal and/or external purposes. The wireless device 2 is also referred to as a UE herein.

The cellular communication network 8 may e.g. comply with any one or a combination of LTE (Long Term Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable.

Over the wireless interface, uplink (UL) communication 4a occurs from the wireless device 2 to the network node 1 and downlink (DL) communication 4b occurs from the network node 1 to the wireless device 2. The quality of the wireless radio interface to each wireless device 2 can vary over time and depending on the position of the wireless device 2, due to effects such as fading, multipath propagation, interference, etc.

The network node 1 is also connected to the core network 3 for connectivity to central functions and a wide area network 7, such as the Internet.

Figure 2:
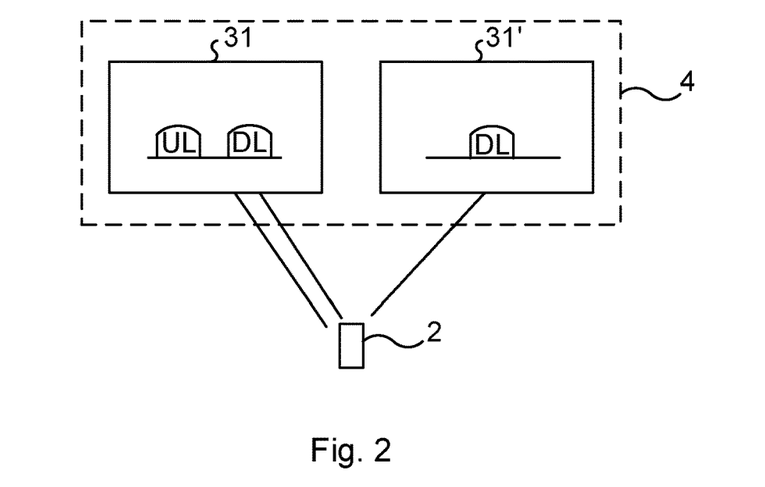
FIG. 2 is a schematic diagram illustrating an environment in which embodiments presented herein can be deployed.

FIG. 2 is a schematic diagram illustrating an environment in which embodiments presented herein can be deployed. The wireless interface, also known as the air interface, for LTE-U is shown in FIG. 2. The wireless device, also known as mobile terminal (UE), 2 is connected to LTE network via wireless interface 4 comprising two air interfaces: the primary carrier 31 which is in a (licensed) 3GPP frequency band and the secondary carrier 31' which is in an unlicensed frequency band (ISM (Industrial, Scientific and Medical) band). In the first implementations, the secondary carrier 31' operates as a Supplemental Downlink (SDL) mode, where there is only transmission data in the DL (Downlink) direction (from the RBS to the wireless device 2. The primary carrier 31 may utilise LTE FDD (Frequency Division Duplex) and/or TDD (Time Division Duplex) and it provides control signalling, mobility and user data while the secondary carrier(s) 31' use unlicensed spectrum with best-effort user data in DL. It is also planned that UL data can be supported by the secondary carrier 31'. Hence, the SDL band may be used as a bi-directional communication channel in the future. The secondary carrier 31' may utilise LTE FDD (Frequency Division Duplex) and/or TDD (Time Division Duplex).

Figure 3:
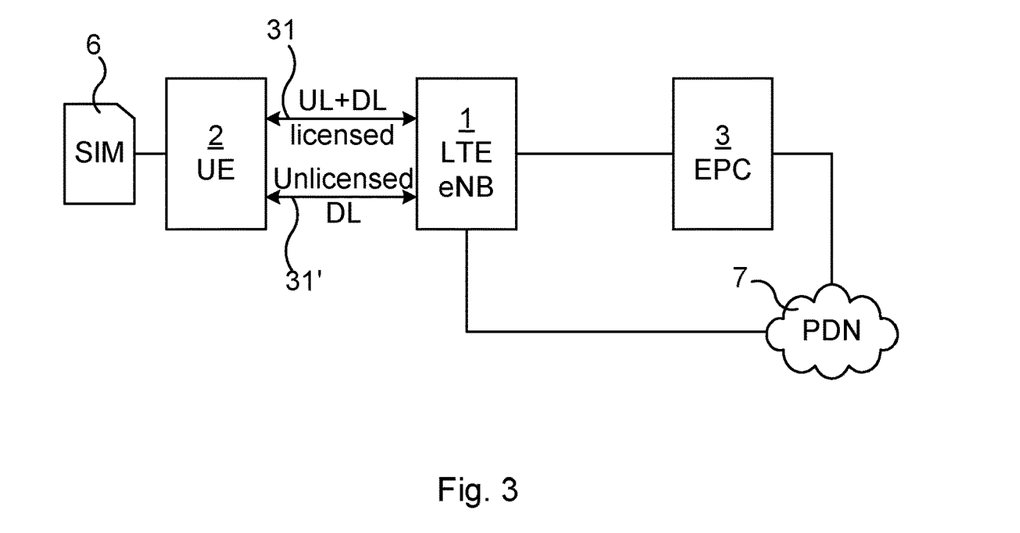
FIG. 3 is a schematic diagram illustrating a network topology in which embodiments presented herein can be applied.

FIG. 3 is a schematic diagram illustrating a network topology in which embodiments presented herein can be applied. The LTE RBS 1 (also known as eNB) is a dual band RBS, where the first operational band (PCell) 31 can e.g. operate at 3GPP band (transmission and reception) and the SDL 31' is only DL (Transmission) e.g. at 4915-5850 MHz. However, this frequency can be also used by 5 GHz Wifi which can cause significant interference for the SDL 4*b*.

The inventors have realised that an improved network utilisation with reduced external interference is achieved by accurately measuring and selecting the best channel frequency for LTE-U. This is established using fast decision making on used transmission and/or reception frequency.

In SDL only, the LTE-U can use a TOR (Transmitter Observation Receiver) receiver in two different modes, a coarse detection mode during the transmit time slot and an accurate detection mode during the receive time slot. In this way, a fast and accurate decision on used transmit frequency is established in one cycle of a transmission time slot and a reception time slot.

When both DL and UL are used for the secondary carrier(s), the TOR receiver is still used for coarse detection mode during the transmit time slot and the LTE-U receiver is used for accurate detection mode during the receive time slot to thereby establish fast and accurate decision on used transmit and receive frequency.

Figure 4:
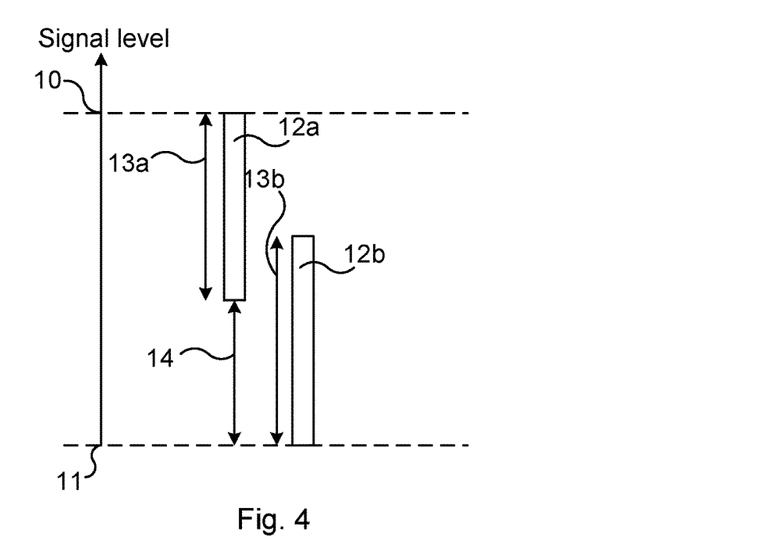
FIG. 4 illustrates how the dynamic range of a TOR receiver is utilised. First, the TOR receiver is used to perform a high signal level coarse pre-scan.

FIG. 4 illustrates how the dynamic range of a TOR receiver is utilised in a network node 1 of FIG. 1 where Time Division Duplex, TDD or Frequency Division Duplex (FDD) is used. TDD implies that communication in either uplink or downlink is performed, but not both simultaneously (on a particular frequency band) and FDD implies that communication for uplink and downlink are performed simultaneously with dedicated frequency bands. The vertical axis represents received signal level, or signal strength. There is a maximum received signal level 10 and a minimum received signal level 11.

A first dynamic range 13*a* for signal is used when the TOR receiver is used to perform a high signal level coarse pre-scan 12*a*. Low signals 14, such as noise signals, below the first dynamic range 13*a* are not detected in this mode.

A second dynamic range 13*b* for signals is then used for a low signal level accurate detection 12*b*.

An embodiment to accomplish a switch between the two modes is performed using a bypass of a low noise amplifier (LNA), controlled by a digital front end 15 and explained in more detail below. In the course pre-scan 12*a*, the LNA is bypassed and in the accurate detection 12*b*, the LNA is active.

The different modes are used to comply with own transmission signal and to be able to detect smaller signal level during receiver period, as illustrated in the FIG. 4.

Figure 5A:
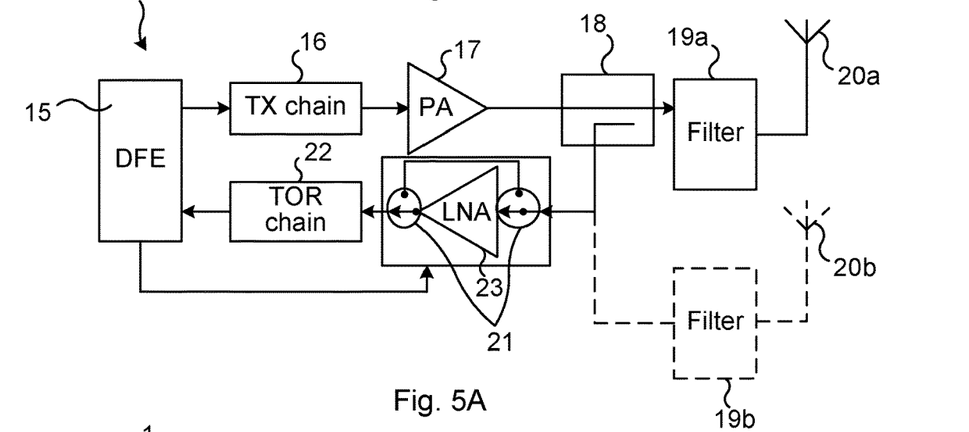
FIGS. 5A-B are a schematic diagrams illustrating some components of embodiments of a network node employed for SDL only for LTE-U.
Figure 5B:
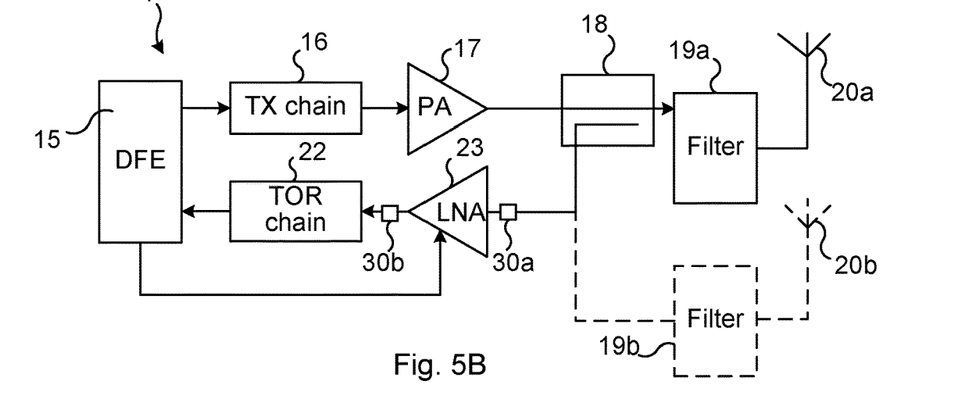

FIGS. 5A-B are schematic diagrams illustrating some components of embodiments of a network node 1 employed for SDL only for LTE-U. Looking first at FIG. 5A, the network node 1 includes a digital front end (DFE) 15, a transmitter (TX) chain 16, a high efficiency power amplifier (PA) 17 and a TOR receiver in a TOR chain 22 for DPD (Digital Pre Distortion), connected to a first filter 19*a* via a directional coupler 18. Alternative methods to implement the directional coupler 18 are to use at least one of a coupler, a coupling capacitor or a circulator. The first filter 19*a* is connected to a first antenna 20*a* for wireless communication with wireless devices as described above. This kind of radio solution is optimal for LTE-U SDL operation since there is no need for additional receiver functionality. Therefore, hardware costs are reduced. For a short description of DPD, DPD is used to create an inverse function of the distortion generated by the PA 17. When the inverse function is applied in the transmission, the effects of the distortion from the PA is reduced or even essentially eliminated.

It is beneficial to select the radio transmit frequency for LTE-U SDL RBS so that a channel is selected for a transmission where interference from WiFi and/or other LTE-U transmissions (or from any other source) is as low as possible.

According to this embodiment, fast measurement and selection of frequency channel for LTE-U is achieved by using the TOR receiver in the TOR chain 22 which is also used for DPD. An LNA 23 with bypass ability, using bypass switches 21, is provided between the TOR chain 22 and the directional coupler 18 to establish measurements during transmit (LNA bypass mode) or DPD active mode and receive (LNA active) or DPD inactive periods. Therefore, the TOR receiver in the TOR chain 22 can be used in two different modes, where the LNA bypass mode, when the switches 21 are in a state to bypass the LNA 23, is a coarse detection mode and the LNA active mode, when the switches 21 are in a state to employ the LNA 23, is an accurate detection mode.

When the LNA 23 is activated, smaller signal levels can be detected in a receive time slot (see dynamic range 13*b* of FIG. 4) when transmission from the network node in question is not active, thus achieving accurate detection. When the LNA 23 is bypassed, coarse detection is in use during own transmit time slot, see dynamic range 13*a* of FIG. 4.

When DPD is operational then a sample of a transmission signal is detected via directional coupler 18 and convoyed to TOR receiver in the TOR chain 22. The sample of the transmission signal is relatively high, whereby the first dynamic range 13*a* (FIG. 4) for received signals is used in the TOR receiver. In this mode, the LNA 23 is bypassed in order to enhance the dynamic range of the TOR receiver to receive the transmission signal sample linearly.

When the TOR receiver is used to linearize the power amplifier 17 with DPD, the TOR receiver 22 may detect interference signals which are within the first dynamic range 13*a* for a coarse pre-scan 12*a* (FIG. 4). The TOR receiver in the TOR chain 22 and/or DFE 15 may include multiple filters implemented using one or more a physical filter components and/or digital filter components to attenuate unwanted signals, like the sample from the own transmission. In this way, the interference signal detection is made easier and more accurate. The operational frequency of the TOR receiver may be changed when the operational mode of the TOR is changed from DPD operation to an interference signal detection mode.

The changes of linear properties of the power amplifier 17 are relatively slow and thus DPD is not needed to be operational all the time. Hence, the TOR receiver can be used during those inactive DPD slots for other purposes, such as the detection of interference signals described herein. When DPD is inactive, the TOR receiver may then be tuned to other frequencies as needed to detect interference signals. As described above, the LNA 23 can be used to detect lower signal levels (see dynamic range 13b of FIG. 4).

By using the TOR receiver in the TOR chain 22 to detect signal levels for various frequencies, this is achieved without the need for any separate receive chain. This is beneficial since the transmitter for the SDL may very well not have a receive chain. The TOR receiver in the TOR chain 22 is typically already present to be used for DPD.

The decision where to allocate LTE-U transmission in the frequency domain and optimal transmission power level can be done in the DFE 15 or in a base band processing unit (not shown). Alternatively, the DFE 15 can provide measurement data to the baseband processing unit for channel and transmission power selection. The decision can be made based on measured signal levels at different LTE-U frequencies. Decision threshold for measured signal level may be predefined or dynamic, i.e. adapted during the operation to current signal levels. The mode is controlled by the DFE 15.

Optionally, the network node 1 includes more than one antenna. For example, the network node may include a second antenna 20b which may be connected to a second filter 19b which is further connected to the LNA 23 and the TOR chain 22. This alternative embodiment may improve the interference signal detection capability of the TOR receiver in the TOR chain 22, since own transmission signal is attenuated by an antenna isolation between the first antenna 20a, used for transmissions, and the second antenna 20b used for reception to the TOR chain. Hence, a second dynamic range 13b (FIG. 4) for signals is enhanced and used for a low signal level accurate detection 12b. If there are multiple antennas or signal detection paths for the interference signal detection, a method shown in FIG. 8A may decide which signal path or signal information are used in different steps 40, 41 and 42. In FIG. 5B, there are no bypass switches as in FIG. 5A around the LNA 23. Instead, when the LNA 23 is to be employed in the receive time slot, a control signal from the DFE 15 to the LNA 23 increases the gain of the LNA to be able to detect signals of lower signal levels (see second dynamic range 13b of FIG. 4). During the transmit time slot, the DFE 15 controls the LNA 23 to reduce its gain to increase the detectable signal levels (see first dynamic range 13a of FIG. 4). When the gain is set to 1 during the transmit time slot, this is equivalent to the bypassing performed in FIG. 5A, but without the need to use the extra bypass switches 21.

An alternative method to implement variable gain for the TOR receiver is to place at least one gain block 30a or 30b into the TOR receiver, placed on either side or on both sides of the LNA 23. The gain block(s) 30a-b can either amplify the signal or attenuate the signal. The gain block 30b maybe an integrated part of the TOR receiver 22. For example, the network node 1 may include a second antenna 20b which may be connected to a second filter 19b which is further connected to LNA 23 and TOR receiver 22.

Figure 6A:
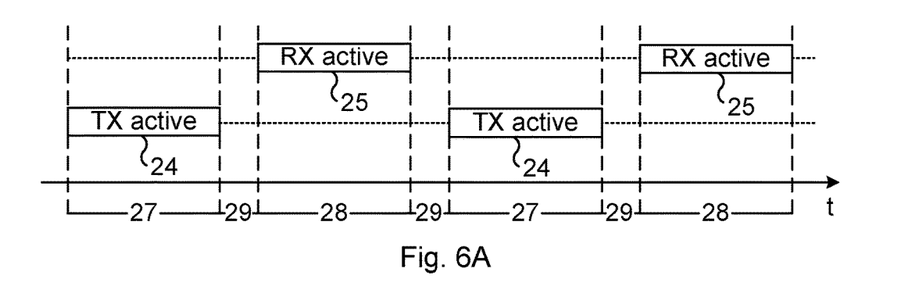
FIGS. 6A-B are schematic diagrams illustrating how the different modes are employed over time, when the TOR receiver operates in two different modes, according to two embodiments.

FIG. 6A is a schematic diagram illustrating how the different modes are employed over time in the network node 1 of FIG. 1, when the TOR receiver operates in two different modes, e.g. as shown in the embodiment of FIGS. 5A-B. During transmit time slots 27, transmission is active 24 and the coarse mode is used and pre-scan of LTE-U frequencies can be done.

During receive time slots 28, reception is active 25 and the TOR is used in accurate mode to perform accurate measurement of the LTE-U channel, i.e. using the LNA 23 of FIGS. 5A-B. In one embodiment, accurate measurements are only performed for frequencies which have had signal level below threshold level, as determined from the coarse mode. In other words, only frequencies which have been found in the coarse mode to have a signal level (from interference) below a threshold are candidates for which accurate measurements are worth obtaining. Alternatively or additionally, the transmission frequencies which were used in a previous receive time slot are scanned.

There are time gaps 29 between the transmit time slots 27 and receive time slots 28.

By using the two modes with different dynamic ranges, both the transmit time slot 27 and the receive time slot 28 can be used to evaluate frequencies to find a good frequency to use for a channel for LTE-U within the unlicensed frequency band. This allows more time to evaluate frequencies leading to a better evaluation than if only the transmit time slot 27 is used or if only the receive time slot 28 is used. A decision on what frequency band, if any, to use can thus be performed in the time frame of one transmit time slot and one receive time slot, i.e. between each instance of a transmit time slot. In this way, switching between different TOR modes can be done during the time gap 29 in between transmit and receive time slots.

Figure 6B:
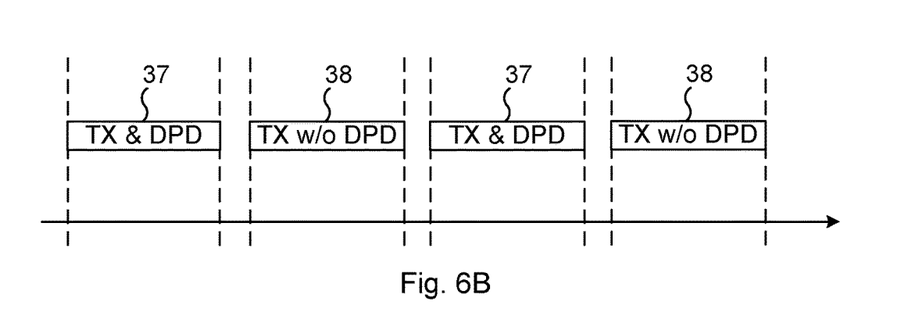

FIG. 6B is a schematic diagram illustrating how the different modes are employed over time in the network node 1 of FIG. 1 in an alternative embodiment, when the TOR receiver operates in two different modes, e.g. as shown in the embodiment of FIGS. 5A-B. During transmission linearization time slots (Tx & DPD) 37, transmission is active and the TOR receiver is used for DPD purposes. At the same time, TOR is used to detect interference signals in the coarse mode and pre-scan of LTE-U frequencies can be done. The TOR is effectively operational at (at least) two different frequencies during the transmission linearization time slot 37: at the transmission frequency and at the (one or more) interference frequency.

During DPD idle mode or inactive linearization time slots (Tx w/o DPD) 38, transmission is active and TOR receiver is tuned to interference frequency. The TOR receiver is used in accurate mode to perform accurate measurement of the LTE-U channel, i.e. using the LNA 23. The signal path where the measured interference signal is coming to LNA 23 may be selected dynamically for example which antenna is used for the purpose.

Figure 7:
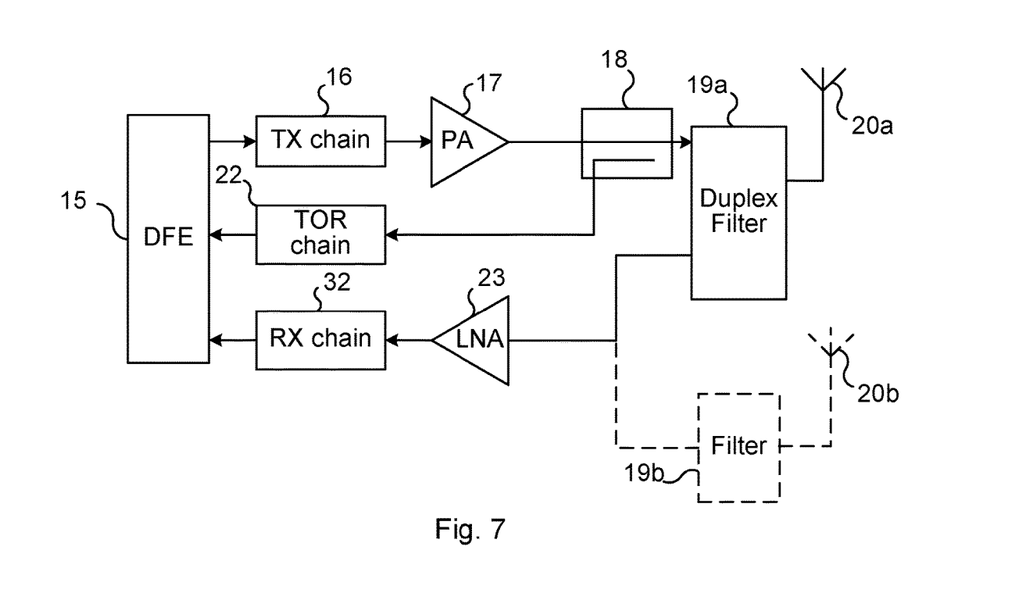
FIG. 7 is a schematic diagram illustrating some components of a network node employed for both UL and DL for LTE-U.

FIG. 7 is a schematic diagram illustrating some components of a network node 1 in an embodiment where both UL and DL is employed for LTE-U. In addition to the network node shown in FIG. 5A, there is a receiver (RX) chain 32 (for the UL) and the LNA 23 is provided between the filter 19a (which is here a duplex filter since both reception and transmission occurs in the network node) and the RX chain 32. In this embodiment, there is no need for an LNA connected to the TOR chain 22.

Also in this embodiment, the two modes are employed as illustrated in FIG. 6 and described above. The TOR receiver in the TOR chain 22 is still used for the coarse mode (in the transmit time slot 27 of FIG. 6), but the regular receiver 32 is used for the accurate mode (in the receive time slot 28 of FIG. 6). In other words, in the coarse mode, no LNA is used and the TOR receiver is used as for the embodiments described above with reference to FIGS. 5A-B. In the accurate mode, the LNA 23 and the receive chain 32 (also used for regular UL signals) is used (instead of the LNA and TOR chain as described above with reference to FIGS. 5A-B). Hence, in this embodiment, no extra components are required to perform the evaluation of signal levels to detect interference in unlicensed frequency bands. The network node 1 may include a second antenna 20b which connected to a second filter 19b which is further connected to the LNA 23 and thus the RX chain 32. In this case, the filter 19a is not a duplex filter.

Figure 8A:
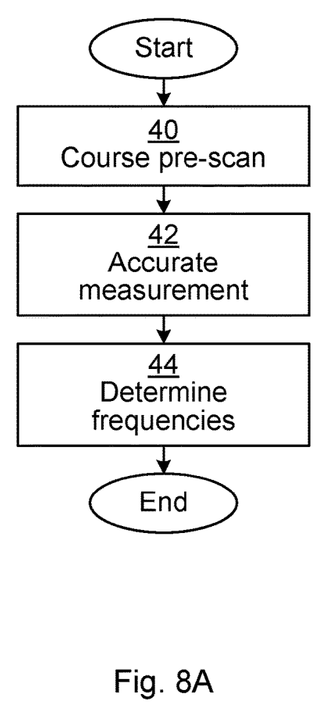
FIGS. 8A-B are flow charts illustrating embodiments of methods for determining an unlicensed frequency band to use.
Figure 8B:
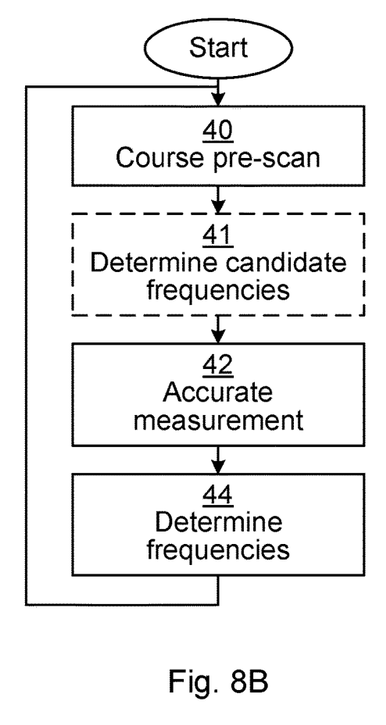

FIGS. 8A-B are flow charts illustrating embodiments of methods for determining an unlicensed frequency band to use. More specifically, the method is used for determining a centre frequency in an unlicensed frequency band to use for downlink communication in a cellular network.

In a course pre-scan step 40, a coarse pre-scan is performed when the network node is in a transmit time slot, yielding respective coarse measurement of signal levels for a plurality of frequencies in the unlicensed frequency band. As explained above, the coarse pre-scan can be performed using the TOR receiver. This corresponds to the first dynamic range 13a of FIG. 4, performed in the transmit time slot 27 of FIG. 6 or in the Tx and DPD time slot 37 of FIG. 6B.

In an accurate measurement step 42, an accurate measurement is performed when the network node is in a receive time slot, yielding respective accurate measurements of signal levels for a plurality of frequencies in the unlicensed frequency band. This corresponds to the second dynamic range 13b of FIG. 4, performed in the receive time slot 28 of FIG. 6 or in the Tx w/o DPD time slot 38 of FIG. 6B.

In one embodiment, as shown in FIG. 5B and explained above, the accurate measurement (in step 42) is performed using the TOR receiver with a first configurable gain, while the coarse pre-scan is then performed (in step 40) using the TOR with a second configurable gain. In such a case, the first configurable gain is higher than the second configurable gain, to improve the accuracy for the accurate measurement while allowing higher signal levels for the course measurements (see dynamic ranges 13a-b of FIG. 4).

In one embodiment, as shown in FIG. 5A and explained above, the accurate measurement (in step 42) is performed using the TOR receiver and the LNA, while the coarse pre-scan is performed (in step 40) using the TOR without the LNA.

In one embodiment, as shown in FIG. 7 and explained above, the accurate measurement is performed using a receive chain of the network node arranged to be used also for receiving uplink communication (in the unlicensed frequency band(s)).

In a determine frequencies step 44, at least one frequency is determined to be used as a centre frequency for a downlink communication channel in the unlicensed frequency band. The centre frequency is selected such that frequencies for which the coarse measurement and/or the accurate measurements indicate a high signal level are avoided. This is done since the high signal levels indicate interference which may have a negative effect for the downlink communication channel. Each centre frequency is in a centre of a frequency band used for a respective downlink communication channel. In one embodiment, the frequencies used in the measurements in the course pre-scan step 40 and/or the accurate measurement step 42 are centre frequencies of potential downlink communication channels. However, this does not need to be the case as long as the measurements are within frequencies used for each downlink communication channel. Optionally, there is a plurality of frequencies within each communication channel for which measurements (in steps 40 and/or 42) are performed.

In one embodiment, the determine frequencies step 44 is performed in the same receive time slot in which the accurate measurement step 42 is performed. In this way, the whole process can be performed during one set of a transmit time slot and a receive time slot, allowing fast adaption to changing radio conditions. Also, by using the different dynamic ranges for the receive time slot and the transmit time slot, evaluation of interference can be performed in both types of time slots, which increases ability to evaluate frequencies in the number of frequencies evaluated and/or the accuracy of such evaluation.

Using embodiments presented herein, there is no need to provide additional WiFi radio receivers to detect interferers when LTE-U is to be used. It is sufficient to use the signal level detection as presented above.

Looking now to FIG. 8B, only new or modified steps compared to the method illustrated by the flow chart of FIG. 8A will be described.

In a determine candidate frequencies step 41, a set of candidate frequencies are determined to be the frequencies for which the course measurements of signal levels are lower than a threshold level.

In such an embodiment, the accurate measurement step 42 is only performed for the set of candidate frequencies.

Figure 9:
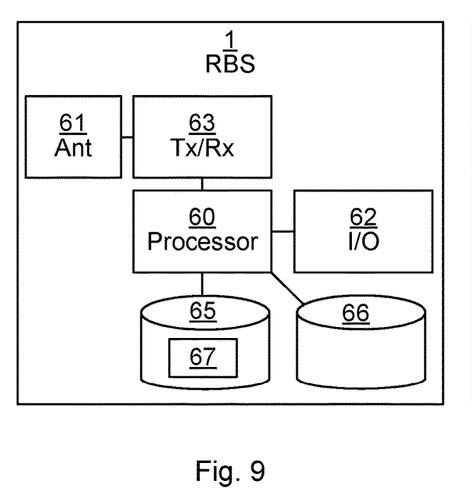
FIG. 9 is a schematic diagram showing some components of the network node of FIG. 1.

FIG. 9 is a schematic diagram showing some components of the network node 1 of FIG. 1. A processor 60 is provided using any combination of one or more of a suitable central processing unit (CPU), multiprocessor, microcontroller, digital signal processor (DSP), application specific integrated circuit etc., capable of executing software instructions 67 stored in a memory 65, which can thus be a computer program product. The processor 60 can be configured to execute the method described with reference to FIGS. 8A-B above.

The memory 65 can be any combination of read and write memory (RAM) and read only memory (ROM). The memory 65 also comprises persistent storage, which, for example, can be any single one or combination of magnetic memory, optical memory, solid state memory or even remotely mounted memory.

A data memory 66 is also provided for reading and/or storing data during execution of software instructions in the processor 60. The data memory 66 can be any combination of read and write memory (RAM) and read only memory (ROM).

The network node 1 further comprises an I/O interface 62 for communicating with other external entities. Optionally, the I/O interface 62 also includes a user interface.

The network node 1 also comprises one or more transceivers 63, comprising analogue and digital components, and a suitable number of antennas 61 for wireless communication with wireless devices as shown in FIG. 1.

Other components of the network node 1 are omitted in order not to obscure the concepts presented herein.

Figure 10:
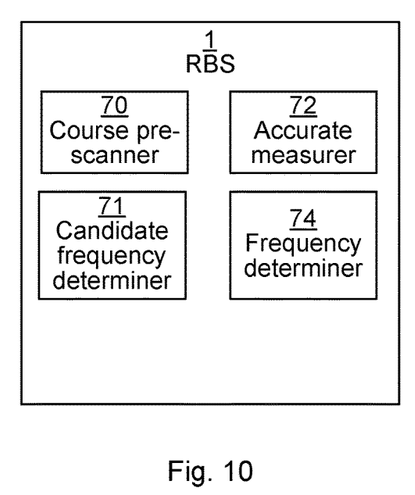
FIG. 10 is a schematic diagram showing functional modules of the network node of FIG. 9 according to one embodiment.

FIG. 10 is a schematic diagram showing functional modules of the network node 1 of FIG. 9 according to one embodiment. The modules are implemented using software instructions such as a computer program executing in the network node 1. The modules correspond to the steps in the methods illustrated in FIGS. 8A-B.

A course pre-scanner module 70 is arranged to perform a coarse pre-scan when the network node is in a transmit time slot, yielding a coarse measurement of signal levels for a plurality of frequencies. This module corresponds to the course pre-scan step 40 of FIGS. 8A-B.

A candidate frequency determiner 71 is arranged to determine a set of candidate frequencies as the frequencies for which the course measurements of signal levels are lower than a threshold level. This module corresponds to the determine candidate frequencies step 41 of FIG. 8B.

An accurate measurer 72 is arranged to perform an accurate measurement when the network node is in a receive time slot, yielding an accurate measurement of signal levels for a plurality of frequencies. This module corresponds to the accurate measurement step 42 of FIGS. 8A-B.

Figure 11:
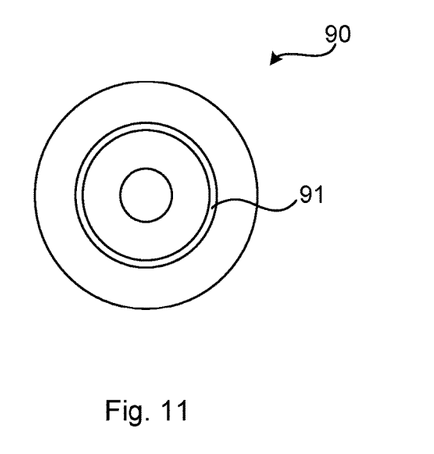
FIG. 11 shows one example of a computer program product comprising computer readable means.

A frequency determiner 74 is arranged to determine at least one frequency to use as a centre frequency for a downlink communication channel. This module corresponds to the determine frequencies step 44 of FIGS. 8A-B. FIG. 11 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 65 of FIG. 9. While the computer program 91 is here schematically shown as a track on the depicted optical disk, the computer program can be stored in any way which is suitable for the computer program product, such as a removable solid state memory, e.g. a Universal Serial Bus (USB) drive.

Here now follows a list of embodiments, enumerated with roman numerals.

i. A method for determining an unlicensed frequency band to use for downlink communication in a cellular network, the method being performed in a network node (1) and comprising the steps of:
  performing (40) a coarse pre-scan when the network node is in a transmit time slot, yielding a coarse measurement of signal levels for a plurality of frequency bands;
  performing (42) an accurate measurement when the network node is in a receive time slot, yielding an accurate measurement of signal levels for a plurality of frequency bands; and
  determining (44) at least one frequency band to use for downlink communication.

ii. The method according to embodiment i, wherein the step of performing (40) a coarse pre-scan is performed using a transmitter observation receiver, TOR.

iii. The method according to embodiment i or ii, wherein the step of performing (42) an accurate measurement is performed using the TOR receiver and a low noise amplifier; and wherein the step of performing (40) a coarse pre-scan is performed using the TOR without the low noise amplifier.

iv. The method according to embodiment i or ii, wherein the step of performing (42) an accurate measurement is performed using a receive chain arranged to be used also for receiving uplink communication.

v. The method according to any one of the preceding embodiments, further comprising a step of:
  determining (41) a set of candidate frequency bands as the frequency bands for which the course measurements of signal levels are lower than a threshold level;
  and wherein the step of performing (42) an accurate measurement is only performed for the set of candidate frequency bands.

vi. The method according to any one of the preceding embodiments, wherein the step of determining (44) at least one frequency band is performed in the same receive time slot in which the step of performing (42) the accurate measurement is performed.

vii. A network node (1) for determining an unlicensed frequency band to use for downlink communication in a cellular network, the network node (1) comprising:
  a processor (60); and
  a memory (65) storing instructions (67) that, when executed by the processor, causes the network node (1) to:
  perform a coarse pre-scan when the network node is in a transmit time slot, yielding a coarse measurement of signal levels for a plurality of frequency bands;
  perform an accurate measurement when the network node is in a receive time slot, yielding an accurate measurement of signal levels for a plurality of frequency bands; and
  determine at least one frequency band to use for downlink communication.

viii. The network node (1) according to embodiment vii, wherein the instructions to perform a coarse pre-scan are performed using a transmitter observation receiver, TOR.

ix. The network node (1) according to embodiment vii or viii, wherein the instructions to perform an accurate measurement are performed using the TOR receiver and a low noise amplifier; and wherein the instructions to perform a coarse pre-scan are executed using the TOR without the low noise amplifier.

x. The network node (1) according to embodiment vii or viii, wherein the instructions to perform an accurate measurement are executed using a receive chain also used for receiving uplink communication.

xi. The network node (1) according to any one of embodiments vii to x, wherein the instructions further comprise instructions that, when executed by the processor, causes the network node to:
  determine a set of candidate frequency bands as the frequency bands for which the course measurements of signal levels are lower than a threshold level;
  and wherein the instructions to perform an accurate measurement is only performed for the set of candidate frequency bands.

xii. The network node (1) according to any one of embodiments vii to xi, wherein the instructions to determine at least one frequency band comprise instructions that, when executed by the processor, causes the network node to determine at least one frequency band in the same receive time slot in which the instructions to perform the accurate measurement are executed.

xiii. A computer program (91) for determining an unlicensed frequency band to use for downlink communication in a cellular network, the computer program comprising computer program code which, when run on a network node (1) causes the network node (1) to:
  perform a coarse pre-scan when the network node is in a transmit time slot, yielding a coarse measurement of signal levels for a plurality of frequency bands;
  perform an accurate measurement when the network node is in a receive time slot, yielding an accurate measurement of signal levels for a plurality of frequency bands; and determine at least one frequency band to use for downlink communication.

xiv. A computer program product (90) comprising a computer program according to embodiment xiii and a computer readable means on which the computer program is stored.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for determining a centre frequency in an unlicensed frequency band to use for downlink communication in a cellular network, the method being performed in a network node and comprising:
performing a coarse pre-scan with a first dynamic range for high signal levels, when the network node is in a transmit time slot, yielding respective coarse measurement of signal levels for a plurality of frequencies in the unlicensed frequency band;
performing an accurate measurement with a second dynamic range for low signal levels, when the network node is in a receive time slot, yielding respective accurate measurement of signal levels for a plurality of frequencies in the unlicensed frequency band; and
determining at least one frequency to use as a centre frequency for a downlink communication channel in the unlicensed frequency band, wherein the centre frequency is selected such that frequencies for which the coarse measurement and/or the accurate measurements indicate a high signal level is avoided.

2. The method according to claim 1, wherein the performing the coarse pre-scan is performed using a transmitter observation receiver (TOR).

3. The method according to claim 2, wherein the performing the accurate measurement is performed using the TOR with a first configurable gain; and wherein the performing the coarse pre-scan is performed using the TOR with a second configurable gain, wherein the first configurable gain is higher than the second configurable gain.

4. The method according to claim 2, wherein the performing the accurate measurement is performed using the TOR and a low noise amplifier; and wherein the performing the coarse pre-scan is performed using the TOR without the low noise amplifier.

5. The method according to claim 1, wherein the performing the accurate measurement is performed using a receive chain of the network node arranged to be used also for receiving uplink communication.

6. The method according to claim 1, further comprising:
determining a set of candidate frequencies as the frequencies for which course measurements of signal levels are lower than a threshold level;
and wherein of performing the accurate measurement is only performed for the set of candidate frequencies.

7. The method according to claim 2, wherein the determining the at least one frequency is performed in the same receive time slot as performing the accurate measurement.

8. A network node for determining a centre frequency in an unlicensed frequency band to use for downlink communication in a cellular network, the network node comprising:
a processor; and
a memory storing instructions that, when executed by the processor, causes the network node to:
perform a coarse pre-scan with a first dynamic range for high signal levels, when the network node is in a transmit time slot, yielding a coarse measurement of signal levels for a plurality of frequencies in the unlicensed frequency band;
perform an accurate measurement with a second dynamic range for low signal levels, when the network node is in a receive time slot, yielding an accurate measurement of signal levels for a plurality of frequencies in the unlicensed frequency band; and
determine at least one frequency to use as a centre frequency for a downlink communication channel in the unlicensed frequency band, wherein the centre frequency is selected such that frequencies for which the coarse measurement and/or the accurate measurements indicate a high signal level is avoided.

9. The network nodes according to claim 8, wherein the instructions to perform a coarse pre-scan are performed using a transmitter observation receiver (TOR).

10. The network node according to claim 9, wherein the instructions to perform the accurate measurement are performed using the TOR with a first configurable gain; and wherein the instructions to perform the coarse pre-scan are executed using the TOR with a second configurable gain, wherein the first configurable gain is higher than the second configurable gain.

11. The network node according to claim 9, wherein the instructions to perform the accurate measurement are performed using the TOR and a low noise amplifier; and wherein the instructions to perform the coarse pre-scan are executed using the TOR without the low noise amplifier.

12. The network node according to claim 8, wherein the instructions to perform the accurate measurement are executed using a receive chain of the network node also used for receiving uplink communication.

13. The network node according to claim 8, wherein the instructions further comprise instructions that, when executed by the processor, cause the network node to:
determine a set of candidate frequencies as the frequencies for which course measurements of signal levels are lower than a threshold level;
and wherein the instructions to performer the accurate measurement are only performed for the set of candidate frequencies.

14. The network node according to claim 8, wherein the instructions to determine the at least one frequency comprise instructions that, when executed by the processor, cause the network node to determine at least one frequency in the same receive time slot as performing the accurate measurement.

15. A network node comprising:
means for performing a coarse pre-scan with a first dynamic range for high signal levels, when the network node is in a transmit time slot, yielding respective coarse measurement of signal levels for a plurality of frequencies in an unlicensed frequency band;
means for performing an accurate measurement with a second dynamic range for low signal levels, when the network node is in a receive time slot, yielding respective accurate measurement of signal levels for a plurality of frequencies in the unlicensed frequency band; and
means for determining at least one frequency to use as a centre frequency for a downlink communication channel in the unlicensed frequency band in a cellular network, wherein the centre frequency is selected such that frequencies for which the coarse measurement and/or the accurate measurements indicate a high signal level is avoided.

16. A non-transitory computer readable storage medium having program code stored therein for determining a centre frequency in an unlicensed frequency band to use for downlink communication in a cellular network, the program code which, when run on a network node, causes the network nodes to perform operations comprising:
  performing a coarse pre-scan with a first dynamic range for high signal levels, when the network node is in a transmit time slot, yielding a coarse measurement of signal levels for a plurality of frequencies in the unlicensed frequency band;
  performing an accurate measurement with a second dynamic range for low signal levels, when the network node is in a receive time slot, yielding an accurate measurement of signal levels for a plurality of frequencies in the unlicensed frequency band; and
  determining at least one frequency to use as a centre frequency for a downlink communication channel in the unlicensed frequency band, wherein the centre frequency is selected such that frequencies for which the coarse measurement and/or the accurate measurements indicate a high signal level is avoided.

17. The non-transitory computer readable storage medium according to claim 16, wherein the program code, when run on the network node, further performing the coarse pre-scan using a transmitter observation receiver (TOR).

18. The non-transitory computer readable storage medium according to claim 17, wherein the program code, when run on the network node, further performing the accurate measurement using the TOR with a first configurable gain; and further performing the coarse pre-scan using the TOR with a second configurable gain, wherein the first configurable gain is higher than the second configurable gain.

19. The non-transitory computer readable storage medium according to claim 17, wherein the program code, when run on the network node, further performing the accurate measurement using the TOR and a low noise amplifier; and further performing the coarse pre-scan using the TOR without the low noise amplifier.

20. The non-transitory computer readable storage medium according to claim 16, wherein the program code, when run on the network node, further performing the accurate measurement using a receive chain of the network node arranged to be used also for receiving uplink communication.

* * * * *